United States Patent [19]

Schmidt

[11] 4,185,235
[45] Jan. 22, 1980

[54] SERVO AMPLIFIER PROVIDING CURRENT TORQUE AND DYNAMIC PARAMETERS

[75] Inventor: Ernest D. D. Schmidt, Cornwell Heights, Pa.

[73] Assignee: Schaevitz Engineering, Pennsauken, N.J.

[21] Appl. No.: 905,009

[22] Filed: May 11, 1978

[51] Int. Cl.² ............................................. G05B 11/01
[52] U.S. Cl. ..................... 318/677; 318/678; 318/681; 330/2; 324/123 C
[58] Field of Search ............... 318/490, 651, 678, 681, 318/679, 677; 330/2; 324/123 C

[56] References Cited

U.S. PATENT DOCUMENTS

| | | | |
|---|---|---|---|
| 3,611,339 | 10/1971 | Richey et al. | 318/490 |
| 3,821,623 | 6/1974 | Inuiya | 318/490 |
| 3,846,688 | 11/1974 | Perloff | 318/490 |

FOREIGN PATENT DOCUMENTS 290262 10/1969 U.S.S.R. .............................. 324/123 C

*Primary Examiner*—B. Dobeck

[57] ABSTRACT

A servo amplifier system includes first and second operational amplifiers, with the second amplifier having a low output impedance. A torque coil is connected directly from the output circuit of the first amplifier to the input circuit of the second amplifier free of any impedance elements which would tend to make the torque coil subject to frequency response variations. Various circuits are provided to feed back error signals from the output circuit of the second amplifier to the input circuit of the first amplifier. A test signal may be connected across torque coil to test the response of the accelerometer including the torque coil.

5 Claims, 1 Drawing Figure

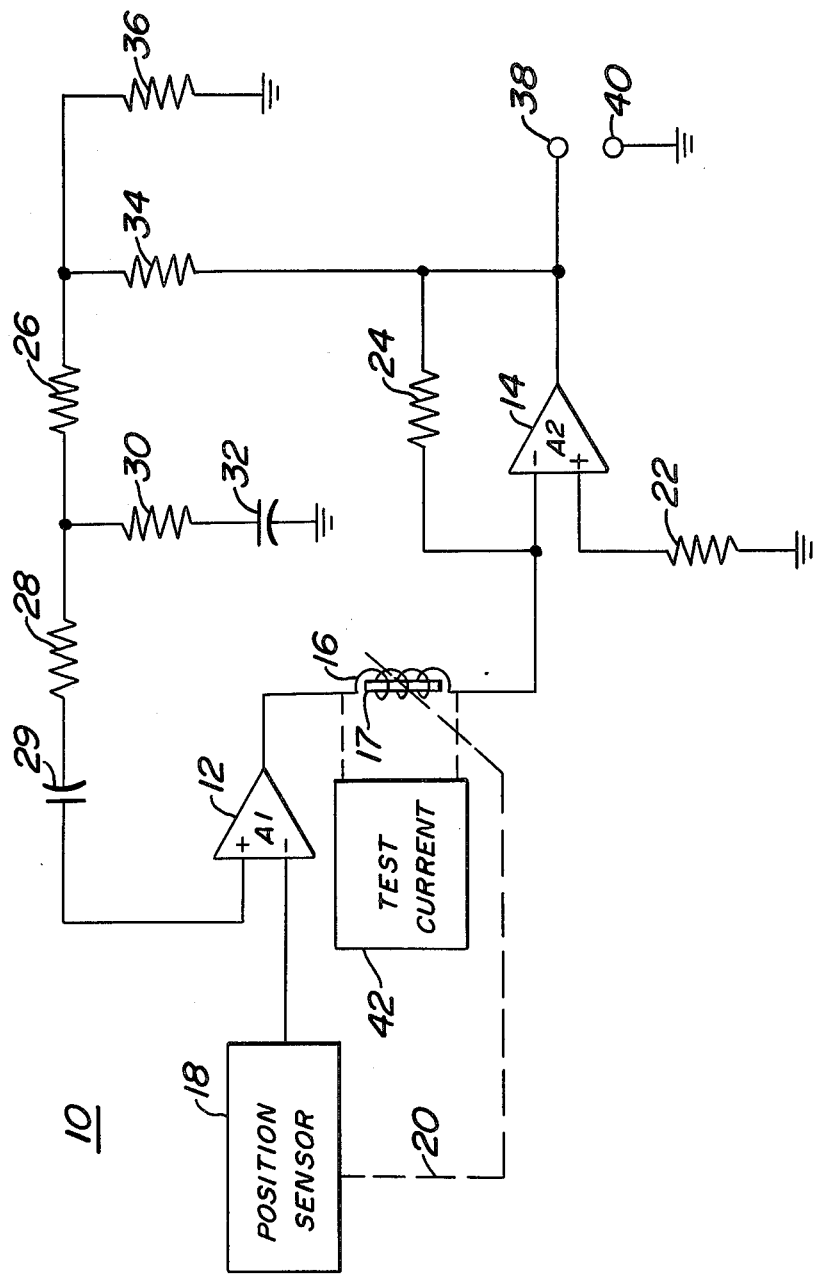

SERVO AMPLIFIER PROVIDING CURRENT TORQUE AND DYNAMIC PARAMETERS

BACKGROUND OF INVENTION

Linear servo accelerometer systems and various circuits and mechanical arrangements associated therewith are well known. Such systems are generally described only so that the general environment of the subject invention may be understood.

Such systems may, for example, include means to permit a movable mass to be freely moved in a pivot assembly in response to acceleration forces. The movable mass may be connected to a torque coil disposed in a magnetic field. In some case, the torque coil itself may comprise the seismic element.

Position detector means, not forming a direct part of the subject invention, are generally employed with servo amplifiers of the type involving the subject invention. A position sensor is used to generate a signal corresponding to the position of the seismic element. This signal is generally applied to an input circuit of an amplifier included in a servo loop. The output signal from the servo amplifier, which could be considered an error signal, is applied to a torque coil which tends to force back the coil to the position it was at before acceleration forces were applied.

One type of position sensor could be an oscillator in which a conductive element, which may be the seismic element, is coupled to the frequency determining tank circuit of the oscillator. When the conductive element is moved, the amplitude of the oscillator is correspondingly varied. A rectifier circuit may be provided for rectifying the output of the oscillator. The torque coil is generally physically connected to the conductive element. The output signal from the rectifying circuit is connected to the torque coil and in effect is used to oppose the acceleration forces applied to the conducting element by restoring the torque coil to a null position.

The general amplifier used in the subject invention is similar in many respects to the amplifier described in a copending application filed concurrently herewith entitled "Servo Amplifier for an Electrically Damped Accelerometer", Ser. No. 905,012, filed May 11, 1978. The amplifiier described in this copending application emphasizes advantages which are also found in this application. However, this application involves an improved output circuit involving the torque coil which facilitates testing and not subject to variable load impedances.

In the copending application to which reference is made, as well as many prior art circuits, the torque coil in the output circuit is often connected to a resistive or other reactive element. As a result, if it is desired to test the output response of the mechanical system by applying a test current through the torque coil, the impedances associated with the coil will tend to vary because of the different electrical components associated with the coil but not forming part of the mechanical arrangement of the accelerator under test. Thus, it is difficult to sample test one accelerometer unit with the assurance that other units will test the same way with distortions caused by impedance changes resulting from slightly different valued elements associated with the torque coil.

It is an object of this invention to provide an improved servo amplifier for an accelerometer system having a low output impedance with improved means for testing the current through a torque coil.

It is a further object of this invention to provide an improved servo amplifier system for an accelerometer system in which the frequency characteristic of the circuit including the coil for measuring acceleration forces is minimized.

In accordance with the present invention, a servo amplifier system for producing error signals for application to a torque coil to counteract the movements resulting from acceleration forces is provided. The system includes first and second operational amplifiers. Electrical signals from a position detector are applied from the output circuit to the input circuit of the first amplifier. The second amplifier has a low impedance output circuit. A torque coil connects the output of the first amplifier to the input of the second amplifier free of any load impedance. A feedback network is connected from the output circuit of the second amplifier to the input circuit of the first amplifier. A utilization device may be connected to the output circuit of the second amplifier.

Other objects and advantages of the present invention will be apparent and suggest themselves to those skilled in the art from a reading of the following specification and claims, in conjunction with the sole FIGURE of the drawing which is an electrical schematic diagram illustrating one form of the present invention.

Referring to the sole FIGURE of the drawing, a servo amplifier system 10 comprises first and second operational amplifiers 12 and 14. A torque coil 16 is disposed in a magnetic field produced by a magnet 18 or other means. The torque coil 16 may be physically connected to the movable mass comprising the seismic element which is directly moved by the acceleration forces. The torque coil 16 is directly connected between the first and second amplifiers 12 and 14 free of any other impedances which would tend to load it or make it frequency sensitive.

The position of the torque coil 16 is detected by a position sensor 18. The coupling between the torque coil 16 and position sensor 18 is illustrated by dashed lines 20. This coupling could represent a conductive arm or paddle magnetically coupled to the tank circuit of an osciallator to vary the amplitude thereof in accordance with the position of the arm. The position sensor 18 may comprise an oscillator of the type previously mentioned in discussion of the prior art.

The output signal from the position sensor 18 is applied to one of the input terminals of the amplifier 12. A second feedback signal, which will be described, is also applied to another input terminal of the amplifier 12.

The output circuit of the amplifier 12 only includes the torque coil 16 with no other impedance elements.

The signal developed from the amplifier 12 is applied directly to one of the input terminals of the second operational amplifier 14. The other input terminal of the amplifier 14 includes a resistor 22 connected to ground. The output circuit of the amplifier 14, which has a very low characteristic impedance, is connected to provide a number of functions. The output signal from the amplifier 14 is fed back through a resistor 24 to the input of amplifier 14. The ratio of the values of the resistors 22 and 24 provide a multiplication factor of the signal which is produced by coil 16. The multiplied voltage is developed at the output circuit of the amplifier 14 as a voltage which is proportional to acceleration.

A feedback path is connected from the output circuit of the amplifier 14 to the input circuit of the amplifier 12. This feedback circuit includes a capacitor 34, resistors 26, 28 and 30 and a capacitor 32. The elements in the feedback path are selected in accordance with the frequencies involved in the system. Resistors 34 and 36 are the gain sensitive components and are selected in accordance with the gain characteristics of the system. With the feedback arrangement illustrated, dynamic error signals are fed back to the input circuit of the amplifier 12.

The output signal from the amplifier 14 is also applied across a pair of output terminals 38 and 40, with the terminal 40 being grounded. The terminals 38 and 40 may be connected to various utilization circuits or devices which may take a wide variety of different forms and have different degrees of loading.

The load connected across the output terminals 38 and 40 is connected across the low impedance of the amplifier 14. Because of the low output impedance of the amplifier 14, any load impedance connected to the output terminals 38 and 40 will not substantially affect the operation of the system.

One of the main features of the subject invention relates to the placement and connections of the torque coil 16. Because the torque coil 16 is directly connected between the amplifiers 12 and 14 without any impedance elements connected thereto, the system is especially adapted for testing. If the torque coil 16 were connected to a load resistor or other element, for example, the tested signals would be subjected to different impedances. This makes it difficult to test a large number of acceleration units.

Generally, the response of the current through the torque coil 16 reflects to some degree all the mechanical characteristics, such as friction and the like, associated with the accelerometer involved. It is desirable that any testing not be affected by electrical elements connected to the torque coil.

A test instruction 42 may be connected across the coil 16 as indicated by dotted lines. Current is induced in the torque coil 16 to simulate actual operating conditions under which the accelerometer being tested is designed to operate. Any output reading across the output terminals 38 and 40 will give a true test not subjected to impedance changes resulting from elements connected to the torque coil 16.

It is recognized that features described in connection with the system described are generally applicable to many servo amplifier accelerometer systems. Values of the various components are subject to variations dependent upon the particular type of system involved and accelerometer used.

The circuit illustrated, while applicable to many systems, has been successfully involved in systems involving LSB-Servo Force Rebalance Linear Accelerometers of the type manufactured by Schaevitz Engineering, Pennsauken, New Jersey. The types of operational amplifiers illustrated may be of the type manufactured by Precision Monolithics (Model OPO1CJ).

What is claimed is:

1. In combination with a position detector for producing electrical signals corresponding to positions of a torque coil subject to movements resulting from acceleration forces which result in current being induced therein, a servo amplifier system for producing error signals for application to said torque coil to counteract the movements resulting from said acceleration forces, comprising:
 a. a first amplifier having an input circuit;
 b. means for applying said electrical signals from said position detector to said input circuit of said first amplifier;
 c. a second amplifier having an input circuit and a low impedance output circuit;
 d. means for connecting said torque coil from said first amplifier to said second amplifier free of any load impedance;
 e. a feedback network connected from the output circuit of said second amplifier to the input circuit of said first amplifier;
 f. utilization means connected to the output circuit of said second amplifier.

2. A servo amplifier as set forth in claim 1 wherein a source of test signals is directly connected across said torque coil to induce currents therein with said torque coil providing the sole impedance element affecting said test signals.

3. A servo amplifier as set forth in claim 2 wherein a first resistive element is included in said input circuit of said second amplifier and a second resistive element is connected from said output circuit to said first resistive element, the ratio of values of said first and second resistive elements providing scaling for said servo amplifier.

4. A combination as set forth in claim 3 wherein said feedback network includes resistive and capacitive elements for controlling the characteristics of the frequencies of the signals fed back.

5. A combination as set forth in claim 4 wherein additional resistive elements are included in said feedback network to control the gain of the fed back signals.

* * * * *